United States Patent Office 2,778,765
Patented Jan. 22, 1957

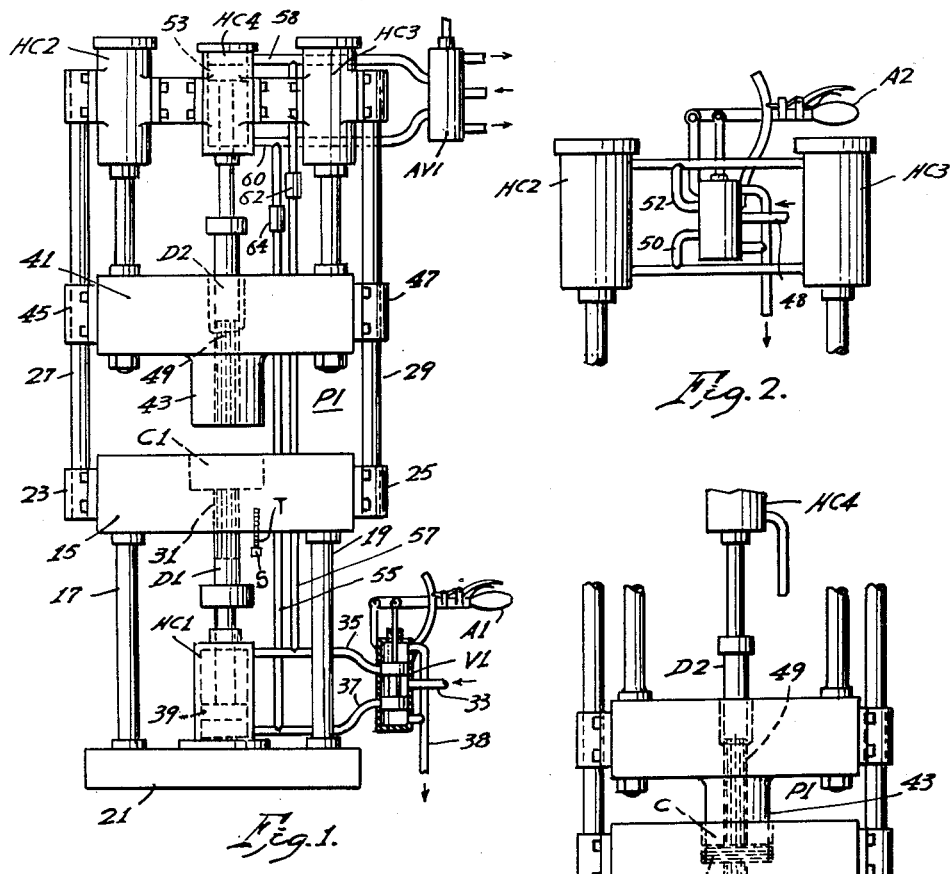

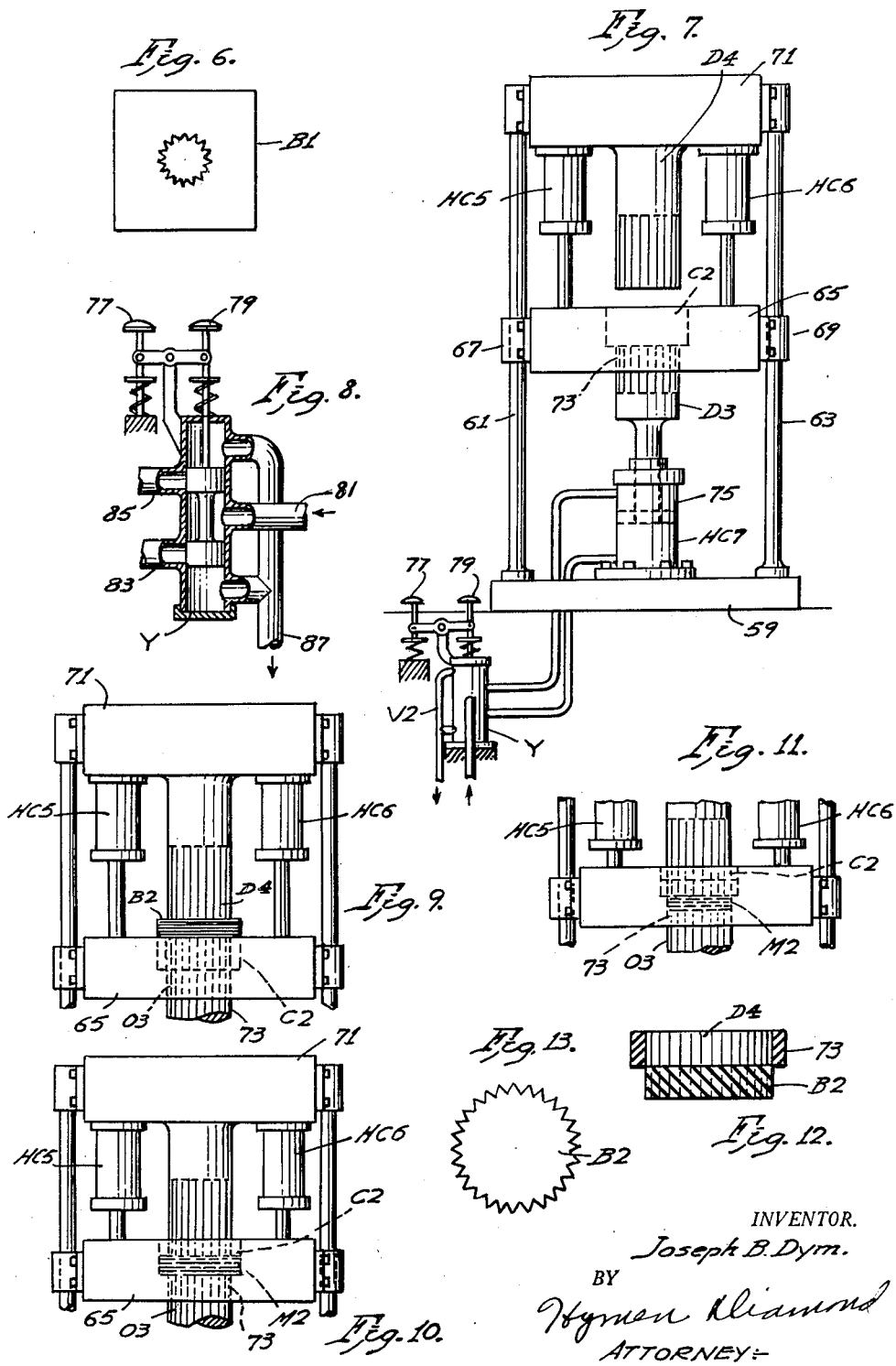

2,778,765

METHOD OF MOLDING BODIES OF FIBROUS RESINATED MATERIAL

Joseph B. Dym, Pittsburgh, Pa.

Application March 5, 1952, Serial No. 274,942

1 Claim. (Cl. 154—110)

My invention relates to molding apparatus and methods of molding and has particular relation to apparatus and methods for molding fibrous resinated material.

The expression fibrous, resinated material as used herein means either fabric or felt or other similar web which is impregnated with a resin such as a phenolic condensation product and layers of which are compressed to form a solid body. Typical materials of this type are laminated Bakelite, but this application is not limited only to this. Such fibrous, resinated materials are frequently used for bodies which in their final form have irregular contours. Such articles for example as either internally or externally dentated gears, cams and the like are made of this material. In general, such articles are characterized by the fact that they are relatively thick at least of the order of $\frac{1}{16}$ inches or greater.

The individual layers which are compressed are very similar to strips of impregnated cloth, paper, felt, or the like. Like ordinary cloth these layers do not readily lend themselves to cutting processes which would pre-form in them the irregular contours desired. If an attempt is made to cut teeth of a gear for example into the layers, the individual strands of the fabric become frayed. During the compressing process the spaces between the frayed strands would be filled with resin and the teeth ultimately produced by compressing the cut material would have weak spots in these regions, and become pitted and dented and fail when subjected to relatively small stresses.

Since the pre-forming process is not practicable or economical, it has been the practice in accordance with the teachings of the prior art, to compress the fibrous resinated material into blanks and to cut the irregular contours into the blanks by the customary milling or lathing processes. Since the cutting processes are carried out by hand in lathes or milling machines they are relatively costly and bodies having irregular contour produced by such methods have a high cost.

It is accordingly an object of my invention to provide a method and apparatus for producing bodies or irregular contour of fibrous resinated material at a relatively low cost.

Another object of my invention is to dispense with the costly cutting operations in the production of bodies of fibrous resinated material which have irregular contour.

A specific object of my invention is to provide a method of molding fibrous resinated material directly into bodies of irregular contour.

Another specific object of my invention is to provide apparatus for forming fibrous resinated material into bodies having irregular contour by purely molding processes.

A further specific object of my invention is to provide apparatus and a method for forming fibrous resinated materials into bodies having an irregular internal contour by purely molding processes.

Still another specific object of my invention is to provide a method and apparatus for forming fibrous resinated materials into bodies having an external irregular contour by purely molding processes.

In accordance with my invention I provide a method in the practice of which the layers of fibrous resinated material are compressed into a homogeneous readily formable mass. After the material is so compressed, it is held by the compressing means and a cutting die, the surface of which corresponds to the desired contour of the material, cuts the contour therein while the material is still formable. Thereafter the material is permitted to solidify while the die remains in engagement therewith.

It is a specific feature of this method that while the homogeneous readily formable mass is being held for cutting by the compressing means, it is not permitted to flow in a direction generally transverse to the direction of movement of the cutting die. In addition the flow of the resin of the material away from the region in which the mass is cut and the consequent distortion of the contour being cut and change in the resin content of the material is avoided.

In accordance with my invention, I also provide molding apparatus for molding the fibrous resinated material into bodies having irregular contour. Such apparatus includes a cavity adapted to receive the material and a press adapted to compress the material in the cavity. Both the cavity and the press are of compound structure including relatively movable dies adapted to cut the desired contour in the material. These dies extend into openings in the press and the cavity and are normally held and moved with the press (or cavity) in a position such that the press and the cavity may compress the material into a readily formable homogeneous mass into which the contour is to be cut. The edges of the dies extending into the press and cavity should in accordance with the specific aspects of my invention preferably be flush and, during the compressing operation move flush, with the adjacent surfaces of the press and cavity. The mass is thus prevented from moving while it is being formed and before the cutting operation. The dies and the cavity and press are operated in timed relationship, preferably, by hydraulic means so that after the mass is formed and while it is still formable the dies are moved through the mass while it is held between the press and cavity producing the desired contour. The dies are then held in the mass until it solidifies.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing, in which Figure 1 is a diagrammatic view of apparatus in accordance with my invention for producing a body having an irregular internal contour;

Fig. 2 is a diagrammatic view of the control for the hydraulic cylinder which drives the press of Fig. 1;

Fig. 3 is a diagrammatic view of a portion of apparatus shown in Fig. 1 at the instant when the homogeneous readily formable mass is produced;

Fig. 4 is a diagrammatic view of a portion of the apparatus shown in Fig. 1 after the cutting operation and while the cutting mass is solidifying;

Fig. 5 is a diagrammatic view showing the relationship between the cutting dies and the mass in apparatus of the type shown in Fig. 1;

Fig. 6 is a view in top elevation of a body produced by the apparatus shown in Fig. 1;

Fig. 7 is a diagrammatic view of apparatus for producing bodies of irregular external contour;

Fig. 8 is a diagrammatic view of the control for the hydraulic cylinder which drives the cavity of Fig. 7;

Fig. 9 is a diagrammatic view of a portion of the apparatus shown in Fig. 7 at the end of an operation;

Fig. 10 is a diagrammatic view of a portion of the apparatus shown in Fig. 7 at the instant when the material is compressed into a homogeneous readily formable mass;

Fig. 11 is a diagrammatic view of a portion of the apparatus shown in Fig. 7 after the material has been cut and while it is solidifying;

Fig. 12 is a diagrammatic view of a portion of the apparatus shown in Fig. 7 following the cutting and solidifying operations; and Fig. 13 is a view in top elevation of a body produced with the apparatus shown in Fig. 7.

The apparatus shown in Fig. 1 comprises a block 15 having a cavity C1 therein corresponding in form to the body to be molded. The block 15 is supported on legs 17 and 19 of the usual type which are mounted on a platform 21. At its ends the block 15 is provided with ears 23 and 25 which slidably engage vertical bars 27 and 29 extending upward from its ends.

The block 15 has a vertical opening 31 centrally disposed therein. The surface of this opening has substantially the same contour as the internal contour of the body to be produced. Within this opening 31 a cutting die D1 in the form of a stud or pin extends slidably. The surface of the die D1 has a contour corresponding to the contour of the body to be produced and fits into the opening 31 so that it may slide therealong, the projections in the contour of die D1 engaging troughs in the contour of the opening 31. The die D1 should fit into the opening closely so that the desired accuracy in the irregular contour in the body may be achieved and in addition so that there may be no flow of the material of which the body is formed when it is compressed into a readily formable homogeneous mass. I have found in practice that the radial clearance between the pin and the surface of the opening should be maintained of the order of one-thousandth of an inch and no greater than five thousandths. The diametral clearance is thus of the order of two thousandths and should not exceed ten thousandths of an inch.

The die D1 is movable upward and downward by a hydraulic cylinder HC1 which is controlled from a valve V1 manually actuable from control arm A1. When the arm A1 is in the central position the connection between the inlet tube 33 and the supply tubes 35 and 37 is closed and the inlet tube communicates with an exhaust tube 38. When the arm A1 is moved upward, fluid is supplied through tube 37 below the piston 39 and the fluid above the piston flows into exhaust tube 38 so that the die D1 moves upward; when the arm A1 is moved downward (from the center position) fluid is supplied through tube 35 above the piston 39 and the fluid below the piston flows into exhaust tube 38 so that the die may move downward.

Preferably, the upper edge of the die D1 should in the quiescent position of the apparatus be flush with the surface of the cavity C1. This arrangement is desirable to prevent flow of the material, particularly the resin, while it is being formed. However, where the material used is made up with an excessively high percentage of resin, the end of the die D1 need not necessarily be flush and some resin may flow into the space between the end and the top of the opening 31.

The uppermost position of the die D1 in the block 15 may be determined by a stop S which extends down from the lower face of the block 15 and engages the flange (collar) on the die just above the cylinder HC1. The stop may be provided with a thread T in its end which engages a thread in the block 15 so that its position may be set as desired and the uppermost position of the die D1 may be determined.

A compound press P1 cooperates with the cavity. This press consists of a block 41 from the base of which a projection 43 corresponding in dimensions to the cavity C1 extends. The block 41 is provided at its ends with ears 45 and 47 which engage slidably the vertical bars 27 and 29.

The press P1 may be moved as a unit by a pair of hydraulic cylinders HC2 and HC3 so that the projection 43 moves into the cavity C1 and is capable of compressing the material in the cavity into a homogeneous readily formable mass.

The cylinders HC2 and HC3 are controlled from an arm A2 (Fig. 2) similar to the arm A1. In its central position, this arm closes the openings between the inlet tube 48; in its up position the inlet tube 48 and the lower supply tube 50 communicate so that fluid flows below the piston (not shown) and the press P1 is raised; and in the down position fluid flows through the inlet tube 48 and the upper supply tube 52 so that the press P1 is lowered.

An opening 49 extends centrally through the projection 43 and the block 41. This opening is coextensive (coaxial) with the opening 31 in the cavity block 15 and has substantially the same contour as that of the body to be molded. A die D2, in the form of a pin or stud, projects slidably into the opening 49 and it also has the contour of the opening. The die D2 is coextensive (colinear) with the die D1 in the cavity block 15. As in the case of the cavity block 15, the radial clearance between the die D2 and its opening 49 is of the order of one thousandth of an inch and should not exceed five thousandths of an inch. The edge of the die D2 should preferably be flush with the outer edge of the projection 43 but need not necessarily be flush, particularly if the resin which impregnates the fibrous material is present in an excessive percentage. The projections of the contour of the die D2 engage the troughs in the contour of the opening 49. The die D1 can slide in the opening 49 precisely in the same manner as die D2.

The die D2 is movable by a hydraulic cylinder HC4 which is coupled to operate with the cylinder HC1 which moves the die D1 in the cavity block 15 in such manner that the pistons 39 and 53 in both cylinders move together. This coupling is effected by supply tubes 55 and 57 which communicate with tubes 35 and 37, respectively, and the region below and above the piston 53 respectively.

The cylinder HC4 is also provided with an auxiliary valve AV1 which may be actuated to move its piston 53 independently of the piston 39 of the cylinder HC1. This valve is actuable together with the valve which actuates the cylinders HC2 and HC3 for the press P1 so that the die D2 can be moved together with the press P1 as well as with the die D1. The supply tubes 58 and 60 from the valve AV1 are isolated from the tubes 35 and 37 by check valves 62 and 64 which permit fluid to flow from tubes 35 and 37 to cylinder HC4 but do not permit fluid to flow from tubes 58 and 60 to cylinder HC1.

In operation the material M1 to be molded is placed in the cavity C1. The hydraulic fluid is then supplied to the cylinders HC2 and HC3 which control the press P1 by moving the arm A2 downward. At the same time, the auxiliary valve AV1 is actuated (it may be actuated by the same arm) so that cylinder HC4 causes the die D2 to move with the press P1. The block 41 and its projection 43 are thus moved down so that the material M1 is compressed into a readily formable homogeneous mass as shown in Fig. 3. When the material is so compressed and while it is still formable and is being held by the projection 43, the handle A1 on the control for the upper and lower cylinders which control the pins is actuated downward. The hydraulic fluid moves the pistons 39 and 53 downward and the upper and lower dies D1 and D2 move together so that the upper die D2 cuts through the formable mass M1 producing the desired contour. Thereafter the dies D1 and D2 are held in their last portion (as shown in Fig. 4) with the mass engaging the upper die D1 until the material solidifies. Then fluid is introduced below the pistons (not shown) of cylinders HC2 and HC3 so that the press P1 is retracted. At the same time die D2 may be retracted with the press P1 for a portion of its travel by actuation of valve AV1. Finally the handle A1 is moved upward and the dies D1 and D2 are reset to their initial position. The body B1 which is formed is then projected out of the cavity C1, by the piece R1 which has been cut from the center and which has now expanded, and may be removed from the mold. The body has the form shown in Fig. 6.

The apparatus shown in Fig. 7 includes a base 59 from the ends of which bars 61 and 63 project. On the bars 61 and 63 a block 65 containing a cavity C2 is slidably supported by ears 67 and 69 engaging the bars.

The cavity corresponds in form to the body to be molded. The block 65 alone may be moved upward and downward by a pair of hydraulic cylinders HC5 and HC6 suspended from a block 71 secured to the bars 61 and 63. The cylinders HC5 and HC6 are controlled by a control similar to that shown in Fig. 2.

Centrally within the cavity block 65 there is an opening 73, the surface of which has substantially the same contour as the irregular contour of the body to be produced. A die D3 in the form of a stud or pin is slidable in this opening. The die D3 has an external contour similar to that of the body and again the radial clearance between the stud and the opening is of the order of one thousandth of an inch but should not be greater than five thousandths. The projections of the contour of die D3 engage the trough in the contour of the opening 73.

The die D3 is movable by a hydraulic cylinder HC7. The piston 75 of this cylinder is controlled from a valve V2 actuable by a pair of linked foot buttons 77 and 79 as shown in Fig. 8. When the buttons 77 and 79 are in a central position the inlet tube 81 is disconnected from the supply tubes 83 and 85 and is connected to an exhaust tube 87. When the button 77 is compressed the inlet tube 81 communicates with the supply tube 83 which delivers fluid below the piston 75 and the other supply tube communicates with the exhaust tube 87 and when the other button 79 is compressed the inlet tube communicates with the supply tube 85 which delivers fluid above the piston 75 and the other tube 83 with the exhaust. The die D3 is thus moved up by compressing the button 77 and down by compressing button 79.

From the block from which the cylinders are suspended another die D4 in the form of a stud or projection extends. This die is coextensive (coaxial or colinear) with the lower die D3 and its external surface also has the desired contour of the body. Both die D3 and die D4 fit relatively closely in the cavity C2 but are movable readily through it and the opening 73 is capable of engaging the die D4 in the same manner as it engages die D3.

In operation, the fibrous resinated material M2 to be molded is deposited in the cavity C2. The lower die D3 and the block 65 are then both moved upward by operating button 77 and a corresponding handle (not shown) for cylinders HC5 and HC6 and compresses the material M2 in a readily formable homogeneous mass as shown in Fig. 10. While this material is still formable and is being held between the upper and lower dies, the cavity block 65 is moved upward by its corresponding cylinders HC5 and HC6, cutting the contour in the formable mass. The cavity block is shown in this last position in Fig. 11. The cut material is squeezed into the space between the cavity C2 and the die D4. Thereafter the cavity block 65 remains in its last position until the material solidifies. The cavity block is then lowered to a position at which the formed body B2 is substantially flush with its upper edge (as shown in Fig. 9) where it is held by die D3. When the die D3 is then lowered the body B2 which has expanded rests on the upper edge of the cavity C2 and may be removed. The body B2 thus formed has the contour shown in Fig. 11. The apparatus may now be set for another operation.

With my apparatus and in the practice of my method, bodies of fibrous resinated material having irregular contour such as gears and cams are thus produced in a molding operation. The cost of milling or otherwise cutting the contours is thus avoided and the bodies may be produced at a substantially lower cost than heretofore. In practicing my invention I have produced a large number of such bodies and have found them to have the same accuracy and the same strength as bodies cut out from blanks.

While I have shown and described specific embodiments of my invention, many modifications thereof are possible. One important modification involves the tying up of the operation of the cylinders HC1 and HC4 with the cylinders HC2 and HC3 or the cylinders HC7 and HC5 and HC6 through mechanical or electronic timers so that they operate in properly timed succession. Such a modification is within the scope of my invention. My invention, therefore, is not to be restricted except insofar as is necessitated by the prior art and by the spirit of the appended claim.

I claim as my invention:

The method of molding bodies of irregular contour composed of fibrous resinated material with a die having a cutting surface corresponding to said contour which comprises the steps of confining a plurality of layers of said material in a cavity of predetermined dimensions, compressing said material while confined in said cavity into a homogeneous readily formable mass, said material being substantially completely enclosed in said cavity when so compressed, and while said mass is formable cutting said contour therein with said die while said material is still substantially completely enclosed and compressed in said cavity, and thereafter causing said mass to solidify substantially fully while said die is still in engagement with it and while said material is still substantially completely enclosed and compressed in said cavity.

References Cited in the file of this patent

UNITED STATES PATENTS

| 1,229,572 | Birnzweig | June 12, 1917 |
| 1,318,700 | Skolnick | Oct. 14, 1919 |
| 1,482,555 | Hall | Feb. 5, 1924 |
| 1,482,732 | Calleson | Feb. 5, 1924 |
| 1,622,048 | Pierson | Mar. 22, 1927 |
| 1,658,567 | MacDonald | Feb. 7, 1928 |
| 1,793,603 | Frederick | Feb. 24, 1931 |
| 1,972,789 | Newkirk | Sept. 4, 1934 |
| 2,260,667 | Hoof | Oct. 28, 1941 |
| 2,267,817 | Costa | Dec. 30, 1941 |
| 2,289,177 | Chandler | July 7, 1942 |
| 2,339,792 | Milano | Jan. 25, 1944 |
| 2,398,227 | Hubbert | Apr. 9, 1946 |
| 2,448,277 | Renier | Aug. 31, 1948 |
| 2,541,297 | Sampson et al. | Feb. 13, 1951 |
| 2,631,381 | Burrows | Mar. 17, 1953 |